(12) United States Patent
Lee (10) Patent No.: US 7,667,690 B2
(45) Date of Patent: Feb. 23, 2010

(54) OPTICAL POINTING DEVICE AND METHOD OF COMPUTING MOVEMENT VALUE THEREOF

(75) Inventor: Bang-Won Lee, Yongin-si (KR)

(73) Assignee: ATLab Inc. (KR)

( * ) Notice: Subject to any disclaimer, the term of this patent is extended or adjusted under 35 U.S.C. 154(b) by 701 days.

(21) Appl. No.: 11/518,324

(22) Filed: Sep. 8, 2006

(65) Prior Publication Data

US 2007/0115260 A1 May 24, 2007

(30) Foreign Application Priority Data

Nov. 21, 2005  (KR) .................... 10-2005-0111399

(51) Int. Cl.
  *G06F 3/033* (2006.01)
  *G09G 5/00* (2006.01)
  *G06M 7/00* (2006.01)
(52) U.S. Cl. ............... 345/166; 345/156; 345/157; 345/163; 250/221
(58) Field of Classification Search ............ None
  See application file for complete search history.

(56) References Cited

U.S. PATENT DOCUMENTS

| 6,281,881 | B1 | 8/2001 | Siddiqui et al. | |
| 2004/0091165 | A1* | 5/2004 | Park et al. | 382/260 |
| 2004/0095323 | A1* | 5/2004 | Ahn | 345/166 |

FOREIGN PATENT DOCUMENTS

| KR | 1020040029836 | 4/2004 |
| KR | 1020040042024 | 5/2004 |
| KR | 1020040042832 | 5/2004 |
| KR | 1020040045174 | 6/2004 |

OTHER PUBLICATIONS

Korean Notice of Allowance; Jun. 1, 2007; Sep. 5, 2007-030932910. All references cited in the foreign Notice of Allowance, and not previously submitted, are listed above.

* cited by examiner

*Primary Examiner*—Jefferey F Harold
*Assistant Examiner*—Taspia Sultana
(74) *Attorney, Agent, or Firm*—Cantor Colburn LLP (57) ABSTRACT

An optical pointing device includes: an image input part emitting light and accumulating the light reflected from a working surface during a sampling period to generate an analog image, and converting the analog image into a digital image to output a sample frame, a correlation matrix generator comparing the sample frame with a reference area to generate a correlation matrix, selecting one weighting matrix of a plurality of weighting matrices in response to a movement value, and outputting a weighted correlation matrix using the selected weighting matrix, a movement value calculator finding a cell having a largest correlation value among the weighted correlation matrix, calculating the movement value and outputting the movement value to a position of the cell, and transmitting the movement value to the correlation matrix generator to select a following weighting matrix, and an interface converting the outputted movement value into a signal of a certain format.

13 Claims, 11 Drawing Sheets

| C(-2,2)  | C(-1,2)  | C(0,2)  | C(1,2)  | C(2,2)  |
|----------|----------|---------|---------|---------|
| C(-2,1)  | C(-1,1)  | C(0,1)  | C(1,1)  | C(2,1)  |
| C(-2,0)  | C(-1,0)  | C(0,0)  | C(1,0)  | C(2,0)  |
| C(-2,-1) | C(-1,-1) | C(0,-1) | C(1,-1) | C(2,-1) |
| C(-2,-2) | C(-1,-2) | C(0,-2) | C(1,-2) | C(2,-2) |

| | | 131 | | |
|---|---|---|---|---|
| 5 | 5 | 5 | 5 | 5 |
| 0 | 3 | 0 | 2 | 1 |
| 6 | 5 | 6 | 6 | 7 |
| 5 | 6 | 5 | 5 | 4 |
| 4 | 4 | 4 | 4 | 4 |

131-1 braces rows 2-4

OPTICAL POINTING DEVICE AND METHOD OF COMPUTING MOVEMENT VALUE THEREOF

CROSS-REFERENCE TO RELATED APPLICATION

This application claims priority to and the benefit of Korean Patent Application No. 2005-111399, filed Nov. 21, 2005, the disclosure of which is incorporated herein by reference in its entirety.

BACKGROUND OF THE INVENTION

1. Field of the Invention

The present invention relates to an optical pointing device and a method of computing a movement value thereof, and more particularly, to an optical pointing device and a method of computing a movement value thereof that are capable of adding different weighting matrices depending on a moving speed of an optical pointing device to reduce an error, which may be generated at highly correlated image patterns.

2. Description of the Related Art

Figure 1:
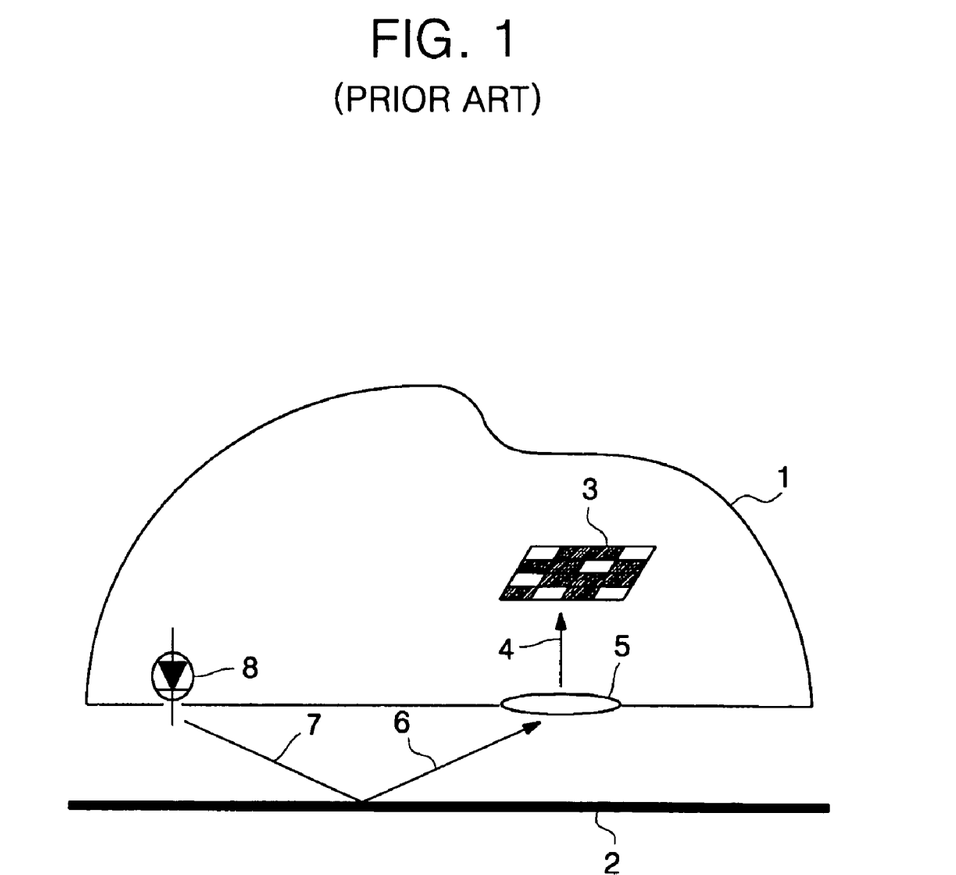
FIG. 1 is a schematic view showing an image obtaining process of an optical mouse as an example of a conventional optical pointing device.

FIG. 1 is a schematic view showing an image obtaining process of an optical mouse as an example of a conventional optical pointing device.

Generally, in the optical mouse shown in FIG. 1, light 7 emitted from a light source 8 is reflected from a working surface 2, and the reflected light 6 passes through a lens 5 to be input to an image sensor 3 composed of a semiconductor chip. The image sensor 3 calculates the amount of the projected light using a plurality of pixels, and compares differences between the pixels to detect a surface pattern. Then, the surface pattern is compared with a pattern made during the previous sample period to compute a movement value of the optical mouse.

Figure 2:
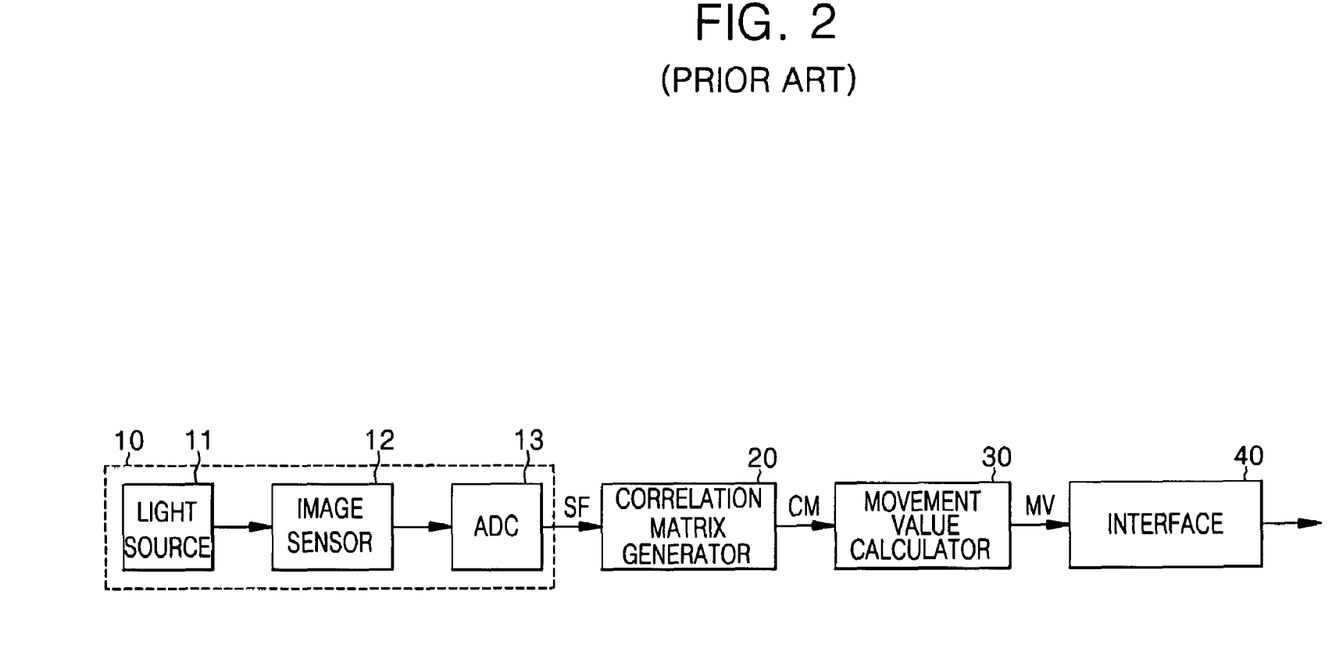
FIG. 2 is a block diagram of a conventional optical pointing device.

FIG. 2 is a block diagram of a conventional optical pointing device.

An image input part 10 includes a light source 11 for emitting light, an image sensor 12 for generating an image, and an A/D converter 13 for converting an analog signal into a digital signal. When light emitted from the light source 11 is reflected from a working surface to project on the image sensor 12, the image sensor 12 composed of a plurality of pixels accumulates the projected light during a sampling period to obtain an image of the working surface. The image sensor 12 generates an image signal using the obtained image to output it in a pixel unit. The A/D converter 13 converts the image signal output from the image sensor 12 into a digital signal to output a sample frame SF.

A correlation matrix generator 20 includes a reference area setting part (not shown), and a correlation generator (not shown), thereby receiving the sample frame SF output from the A/D converter 13 when sampling. The reference area setting part updates a reference frame using the sample frame applied during the previous sampling period, and sets a certain area of the updated reference frame to a reference area. The correlation generator generates a correlation matrix CM representing a correlation between the obtained sample frame and the reference area to thereby output the correlation matrix CM to a movement value calculator 30.

The movement value calculator 30 analyzes the correlation matrix CM generated from the correlation matrix generator 20 to output the position of a cell having the highest correlation as a movement value MV.

An interface 40 converts the movement value output from the movement value calculator 30 in a designated format to output it to an external device.

Figure 3A:
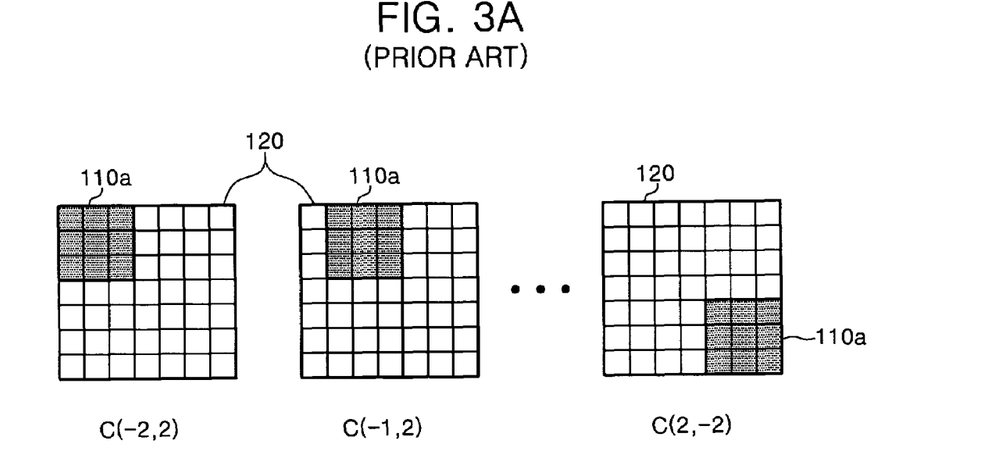
FIG. 3A is a view for explaining a conventional method of computing a correlation between a sample frame and a reference area.

FIG. 3A is a view for explaining a conventional method of computing a correlation between a sample frame and a reference area.

A reference area 110a is scanned from a left upper corner of a sample frame 120 to a right lower corner in a pixel unit in a zigzag to generate a correlation value.

Figure 3B:
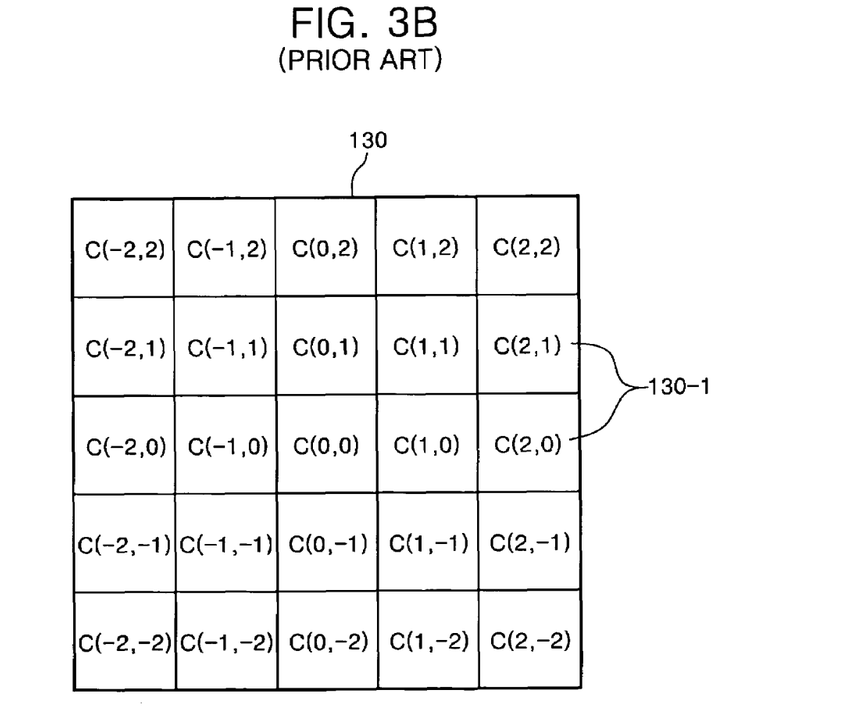
FIG. 3B is a view showing a correlation matrix composed of correlation values generated by the method of FIG. 3A.

FIG. 3B is a view showing a correlation matrix composed of the correlation values generated by the method of FIG. 3A.

The correlation values may be generated by various methods, but a method of comparing each pixel of the sample frame 120 with each pixel of the reference area 110a and calculating the number of pixels having different values is exemplarily described herein. When the correlation values are generated on the basis of the number of pixels having different values, a cell having the smallest value in the correlation matrix has the highest correlation, and therefore, a movement value is calculated using a position of the cell having the smallest value.

Coordinates of each cell are used to find the position of a sample frame having the highest correlation and calculate a movement direction and a distance in a pixel unit. For example, when a cell having the smallest value in the correlation matrix is C(−2, 1), it means that an optical pointing device moves by −2 pixels in an X-axis direction, and 1 pixel in a Y-axis direction.

Figure 4A:
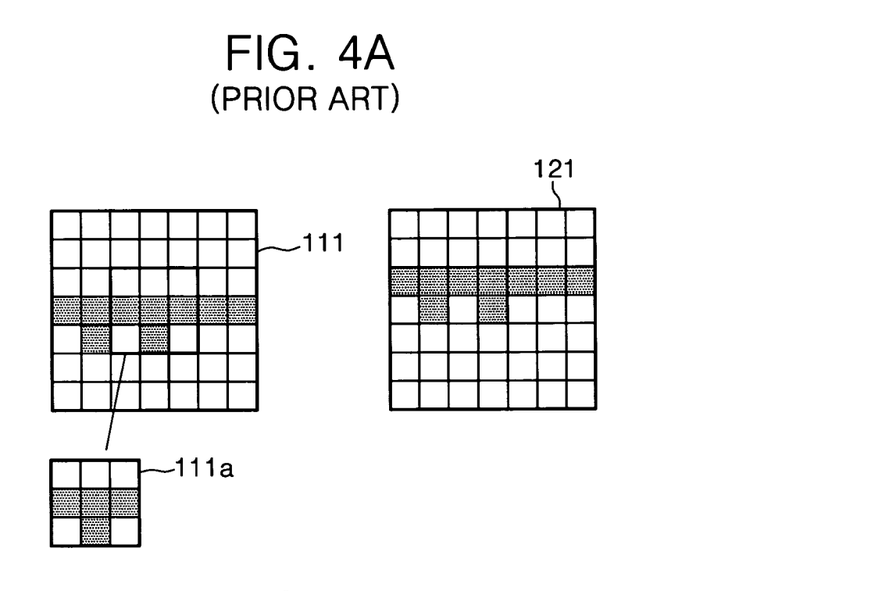
FIG. 4A is a view of a reference frame, a reference area, and a sample frame according to a conventional art.

FIG. 4A is views of a reference frame 111, a reference area 111a, and a sample frame 121.

FIG. 4A shows that the sample frame 121 moves in a Y-axis direction by 1 pixel with respect to the reference frame 111. In this process, it is assumed that a value of a dark pixel is 1 and a value of a bright pixel is 0.

A sample frame obtained during the previous sampling period is updated as the reference frame 111, and the reference area 111a is designated as a certain area of the reference frame 111.

Each pixel of the reference area 111a is compared with the sample frame 121 to obtain a correlation value using a method of computing the number of pixels having different values. First, when the reference area is compared with a left upper corner of the sample frame, the number of pixels which is not equal to each other is 5, and therefore, a correlation value is "5". When the reference area is compared with a right lower corner of the sample frame, the number of pixels which is not equal to each other is 4, and therefore, a correlation value is "4". A correlation matrix 131 composed of correlation values generated by the above method is shown in FIG. 4B.

Figure 4B:
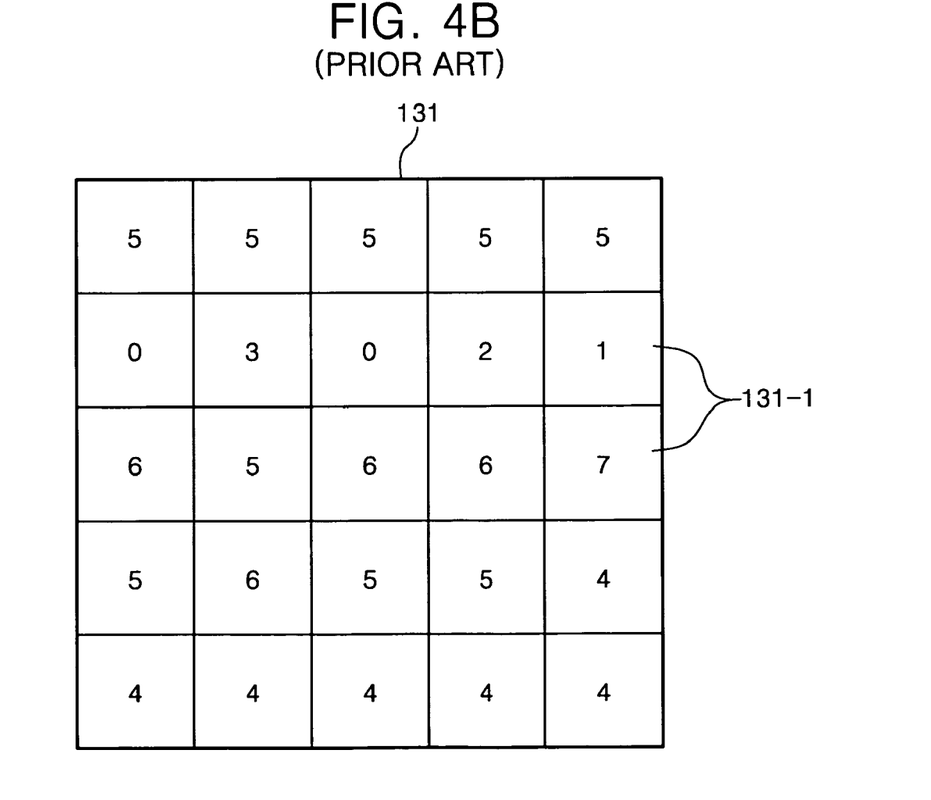
FIG. 4B is a block diagram of a correlation matrix generated by the reference area and the sample frame in FIG. 4A.

Describing the correlation matrix 131 in FIG. 4B in conjunction with FIG. 3B, a value of each cell 131-1 in FIG. 4B is obtained by comparing the reference area 111a with the sample frame 121 in FIG. 4A. The value "5" in FIG. 4B corresponding to C(−2, 2) in FIG. 3B is a value obtained by comparing the reference area 111a with a left upper corner of the sample frame 121. A value "6" in FIG. 4B corresponding to C(0, 0) in FIG. 3B is a value obtained by comparing the reference area 111a with a center of the sample frame 121. Therefore, a cell having the smallest value of the cells in the correlation matrix 131 has the highest correlation, and a movement value of a mouse can be calculated using a position of the cell. However, as shown in FIG. 4B, there are two cells having the smallest value "0", i.e., C(−2, 1) and C(0,1), and it means that the same two patterns as the reference area 111a exist in the sample frame 121. In this case, it is impossible for the optical pointing device to determine whether the optical pointing device moves by a movement value of −2 pixels in an X-axis direction and 1 pixel in a Y-axis direction, or a movement value of 1 pixel in a Y-axis direction.

As a result, in the conventional optical pointing device including the optical mouse, when the same pattern as the reference area is many in the sample frame, since a plurality of cells having the highest correlation also exist in the correlation matrix, a movement value of the optical pointing device may not be calculated. For example, when movement of a finger is determined using the optical pointing device, a fingerprint of the finger has high regularity, and thus, numerous cells may have the highest correlation. Therefore, it is difficult for the conventional correlation matrix to calculate the movement value.

SUMMARY OF THE INVENTION

In order to solve the foregoing and/or other problems, it is an aspect of the present invention to provide an optical pointing device capable of preventing the occurrence of an error due to a plurality of patterns similar to a reference area which exist in a sample frame.

It is another aspect of the present invention to provide a method of computing a movement value of the optical pointing device.

Additional aspect and advantages of the present invention will be set forth in part in the description which follows and, in part, will be obvious from the description, or may be learned by practice of the invention.

The foregoing and/or other aspects of the present invention may be achieved by providing an optical pointing device including: an image input part for emitting light and accumulating the light reflected from a working surface during a sampling period to generate an analog image, and converting the analog image into a digital image to output a sample frame; a correlation matrix generator for comparing the sample frame with a reference area to generate a correlation matrix, selecting one weighting matrix of a plurality of weighting matrices in response to a movement value, and outputting a weighted correlation matrix using the selected weighting matrix; a movement value calculator for finding a cell having a largest correlation value among the weighted correlation matrix, calculating the movement value and outputting the movement value to a position of the cell, and transmitting the movement value to the correlation matrix generator to select a following weighting matrix; and an interface for converting the movement value output from the movement value calculator into a signal of a certain format.

In an embodiment of the optical pointing device, the correlation matrix generator may include: a reference area setting part for updating a reference frame using the sample frame input during the previous sampling period, and setting a reference area as a certain area of the reference frame; a correlation generator for comparing the sample frame input from the image input part with the reference area set in the reference area setting part while moving the reference area in a pixel unit, and calculating each correlation value to generate a correlation matrix; a weight selector for receiving the previous movement value from the movement value calculator, and selecting one weighting matrix of a plurality of weighting matrices to output the selected weighting matrix; and a weight calculator for weighting the output correlation matrix and the weighting matrix selected from the weight selector in a designated manner.

In another embodiment, the weight selector may select a weighting matrix having a larger weight as a cell is positioned far from a center cell when the movement value is small, selects a weighting matrix having a larger weight as a cell is positioned adjacent to a center cell when the movement value is large, and selects a weighting matrix having a smaller increment value from a center cell to peripheral cells than the weighting matrix having a small movement value when the movement value is middle.

In still another embodiment, the weight calculator may be an adder for adding a value of a cell of the correlation matrix to a value of a corresponding cell of the weighting matrix.

In yet another embodiment, the weight calculator may be a multiplier for multiplying a value of a cell of the correlation matrix by a value of a corresponding cell of the weighting matrix.

In yet another embodiment, the weight calculator may be an adder and a multiplier for adding a certain number to a value of a cell of the correlation matrix, and multiplying the added value by each value of a corresponding cell of the weighting matrix.

Another aspect of the present invention may be achieved by providing a method of computing a movement value of an optical pointing device including: an image input step of emitting light, accumulating the light reflected from a working surface during a sampling period to generate an analog image, and converting the analog image into a digital signal to output a sample frame; a correlation matrix generating step of comparing the sample frame and a reference area to generate a correlation matrix, selecting one weighting matrix of a plurality of weighting matrices in response to a movement value, and outputting the correlation matrix weighted using the selected weighting matrix; a movement value calculating step of finding a cell having a largest correlation value of the weighted correlation matrix to calculate the movement value and output the calculated value to a position of the cell; and an interface step of converting the movement value output from the movement value calculating step into a signal of a certain format and then outputting the result.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Hereinafter, an optical pointing device and a method of computing a movement value thereof will be described with reference to the accompanying drawings.

An optical pointing device of the present invention adds a weight to a correlation matrix in order to prevent the occurrence of an error due to a plurality of patterns similar to a reference area which exist in a sample frame. A plurality of weighting matrices for adding weights are provided to select one weighting matrix with reference to the previous movement value.

An optical mouse of an optical pointing device will now be exemplarily described for the convenience of description.

Figure 5:
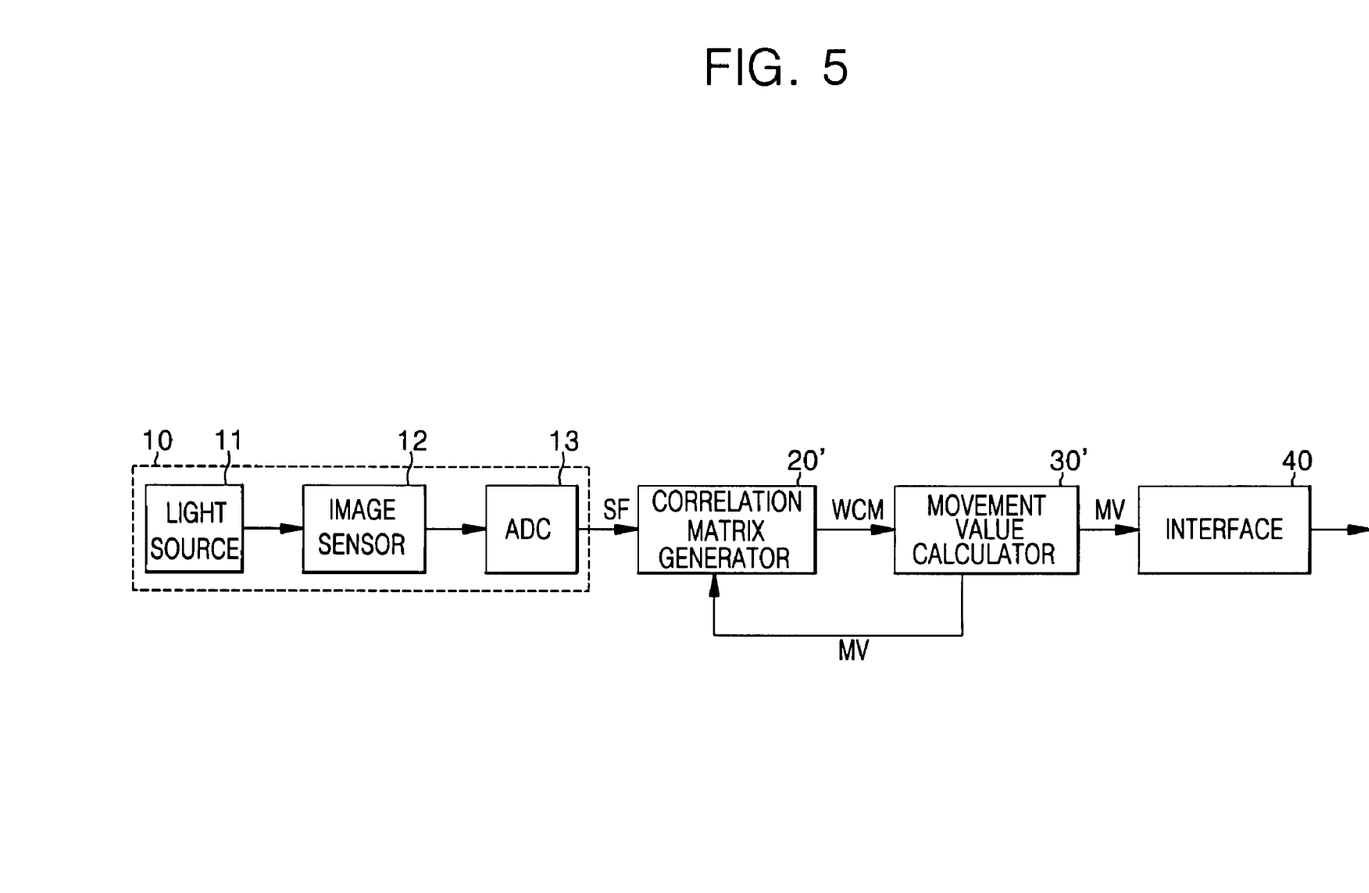
FIG. 5 is a block diagram of an optical pointing device in accordance with an embodiment of the present invention.

FIG. 5 is a block diagram of an optical pointing device in accordance with an embodiment of the present invention.

An image input part 10 and an interface 40 have the same configuration as the conventional optical mouse. A movement value calculator 30' transmits a previous movement value MV to a correlation matrix generator to select a weighting matrix.

A correlation matrix generator 20' weights a weighting matrix, selected by a movement value MV input from the movement value calculator 30', to the correlation matrix generated by comparing a sample frame SF output from the image input part 10 and a reference area, and outputs the weighted correlation matrix WCM.

Reasons of selecting one weighting matrix of the plurality of weighting matrices will now be described in conjunction with FIGS. 4A and 4B. Since the sample frame 121 moves in a Y-axis direction by one pixel with respect to the reference frame 111 in FIG. 4A, a weighting matrix should be configured such that a cell corresponding to C(0,1) of two cells 131-1 having a value "0" is selected in FIG. 4B. However, if a weighting matrix that contains all equal values is applied, moving the reference area 111a with respect to the reference frame 111 by −2 pixel in an X-axis direction and 1 pixel in a Y-axis direction generates the same correlation as C(0,1). In this case, the optical mouse does not distinguish the right movement from only correlation values of C(0,1) and C(−2, 1). Therefore, a plurality of weighting matrices should be provided to select one weighting matrix depending on each circumstance, on the basis of the previous movement value for selecting a weighting matrix. That is, the weighting matrix is configured such that a cell positioned at a center of cells having a high correlation in the correlation matrix is selected when the previous movement value is small and a cell positioned at an outer part of cells having a high correlation in the correlation matrix is selected when the previous movement value is large.

Figure 6:
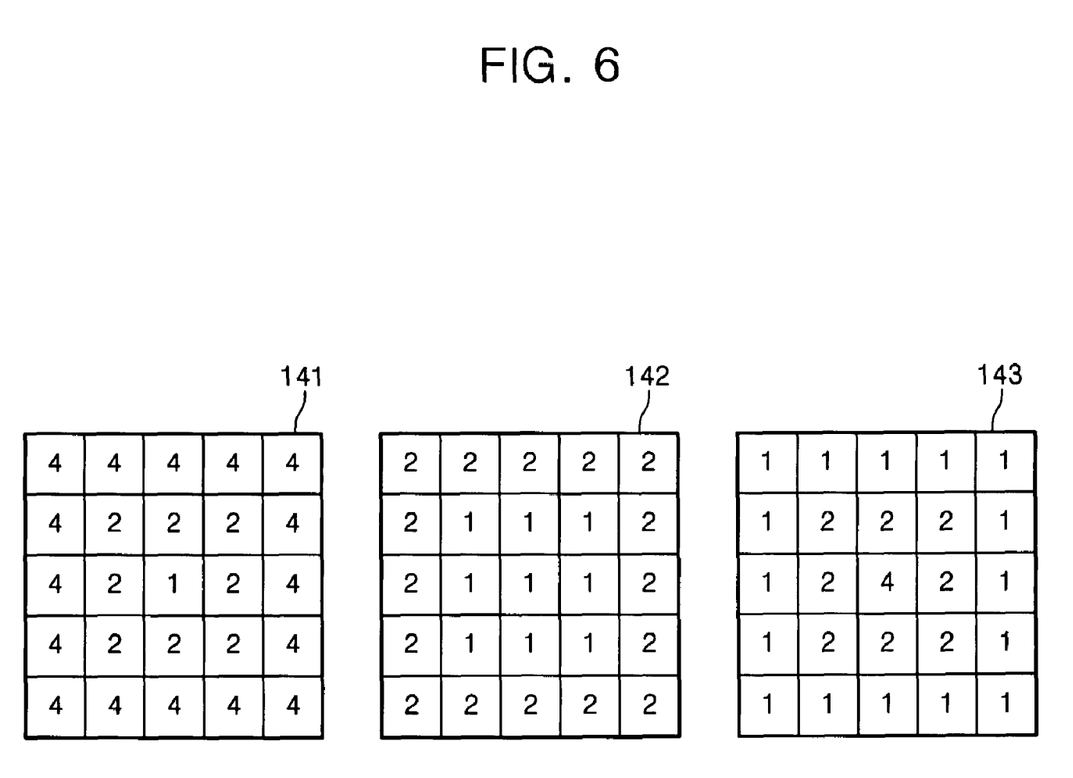
FIG. 6 is a view of a weighting matrix in accordance with an embodiment of the present invention.

FIG. 6 is a view of a weighting matrix in accordance with an embodiment of the present invention.

A first weighting matrix 141 is selected when the previous movement value is small, i.e., when a mouse slowly moves, in which a weight becomes larger from a center to a periphery.

A third weighting matrix 143 is selected when the previous movement value is large, i.e., when a mouse quickly moves, in which a weight becomes smaller from a center to a periphery.

A second weighting matrix 142 is selected when the previous movement value is middle, i.e., when a mouse moves at a middle speed, in which a weight becomes larger from a center to a periphery by an a smaller increment value from a center cell to peripheral cells than first weighting matrix 141.

Figure 7:
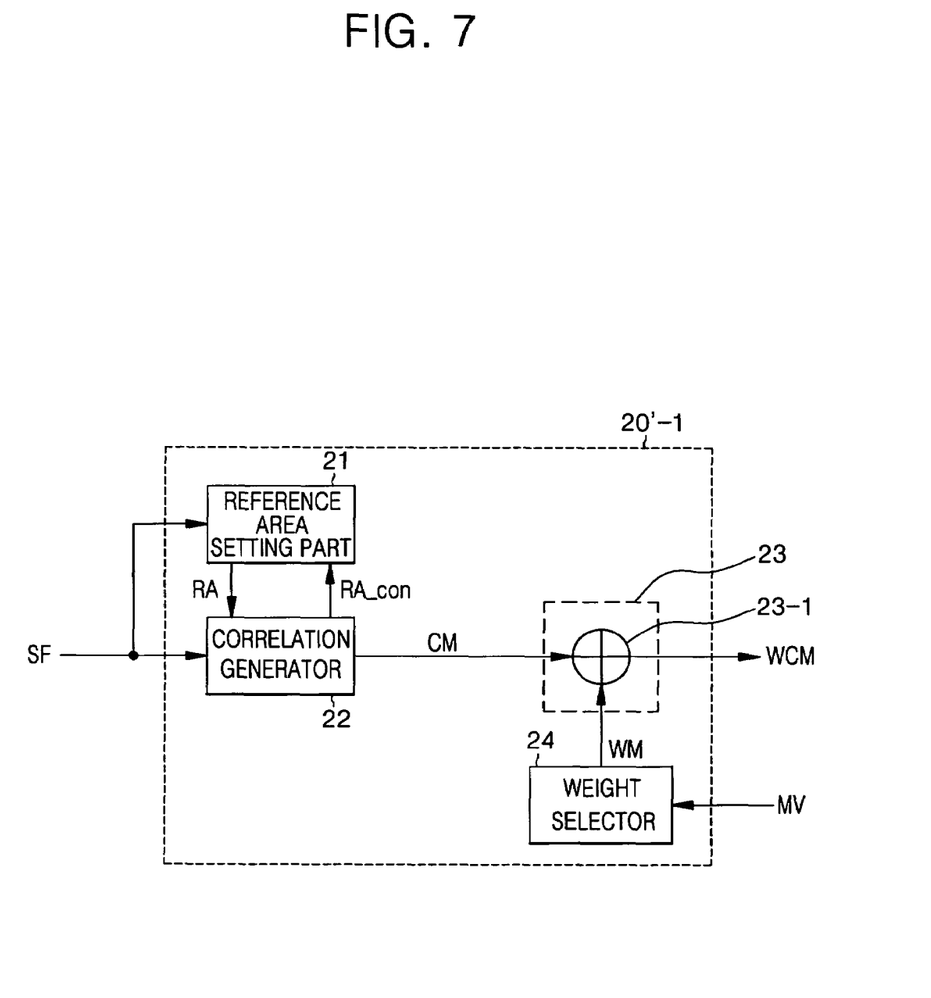
FIG. 7 is a block diagram of a first embodiment of a correlation matrix generator in accordance with the present invention.

FIG. 7 is a block diagram of a first embodiment of a correlation matrix generator in accordance with the present invention.

In FIG. 7, a correlation matrix generator 20'-1 includes a reference area setting part 21, a correlation generator 22, a weight selector 24, and a weight calculator 23.

The reference area setting part 21 updates a sample frame SF input during the previous sampling period as a reference frame RF, and transmits a reference area RA as a certain area of the reference frame RF to the correlation generator 22 during the following sampling period. In this process, the reference area RA receives a reference area control signal RA_con from the correlation generator 22 to be designated as a certain area of the reference frame RF.

The correlation generator 22 receives a sample frame SF from the image input part 10, receives a reference area RA from the reference area setting part 21, and compares the reference area RA with the sample frame SF while moving the reference area RA, thereby generating and outputting a correlation matrix CM.

The weight selector 24 having a plurality of weighting matrix WM receives the previous movement value MV from a movement value calculator 30' of FIG. 5, and selects one weighting matrix WM depending on the movement value MV, thereby outputting the selected weighting matrix WM to the weight calculator 23.

The weight calculator 23 is composed of an adder 23-1, receives a correlation matrix CM input from the correlation generator 22 and a weighting matrix WM selected by the weight selector 24, and adds them to output the weighed correlation matrix WCM to the movement value calculator 30'. At this time, each cell of the correlation matrix CM and each corresponding cell of the weighting matrix are added.

Figure 8:
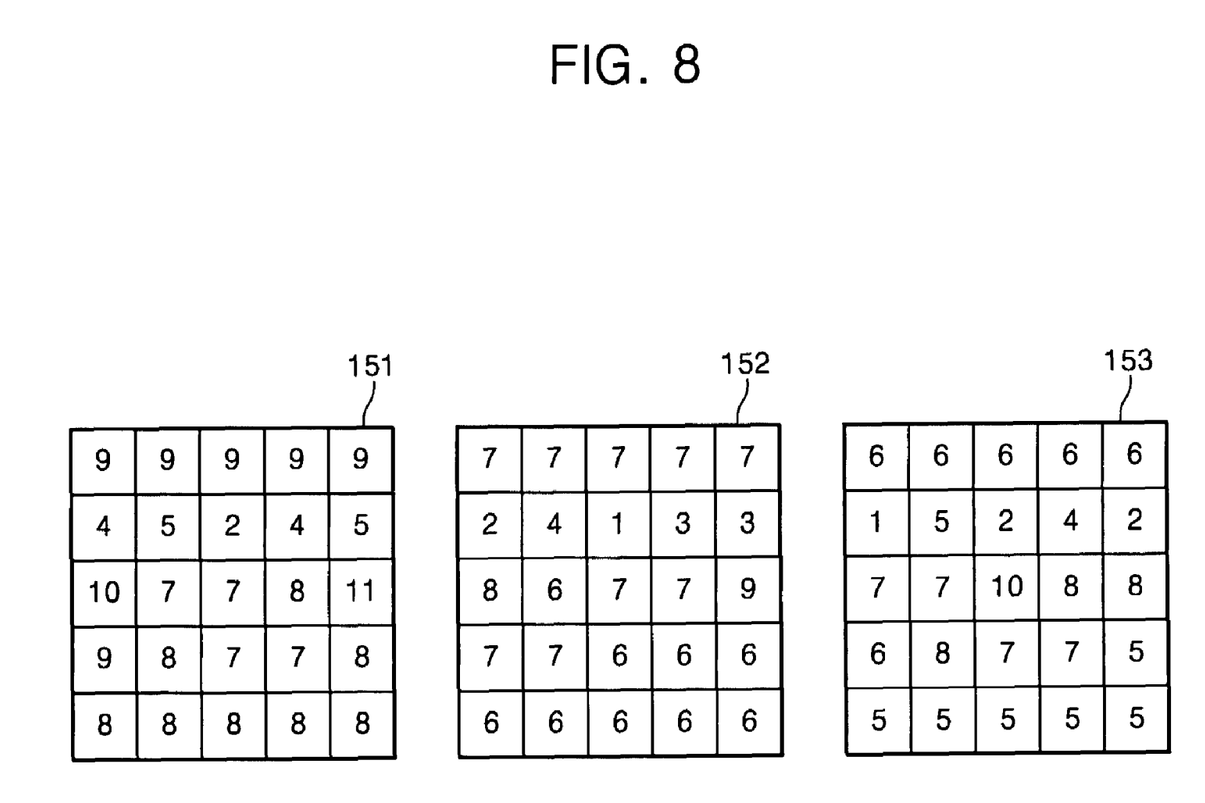
FIG. 8 is a view of a first embodiment of correlation matrices in which the weighting matrices in FIG. 6 are weighted to the correlation matrix in FIG. 4B using a method of FIG. 7.

FIG. 8 is a view of a first embodiment of weighted correlation matrices in which the weighting matrices 141, 142 and 143 in FIG. 6 are weighted to the correlation matrix 131 in FIG. 4B using the method of FIG. 7.

A weighted correlation matrix 151 is generated by adding the weighting matrix 141 selected when the previous movement value MV is small, i.e., when the optical mouse slowly moves, to the correlation matrix 131 in FIG. 4B. At this time, since a cell having the smallest value in the weighted correlation matrix 151 has a value "2", a cell C(0,1) has the largest correlation.

A weighted correlation matrix 153 is generated by adding the weighting matrix 143 selected when the previous movement value MV is large, i.e., when the optical mouse quickly moves, to the correlation matrix 131 in FIG. 4B. At this time, since a cell having the smallest value in the weighted correlation matrix 153 has a value "1", a cell C(−2,1) has the largest correlation.

A weighted correlation matrix 152 is generated by adding the weighting matrix 142 selected when the previous movement value MV is middle, i.e., when the optical mouse moves at a middle speed, to the correlation matrix 131 in FIG. 4B. At this time, since a cell having the smallest value in the weighted correlation matrix 152 has a value "1", a cell C(0,1) has the largest correlation.

Figure 9:
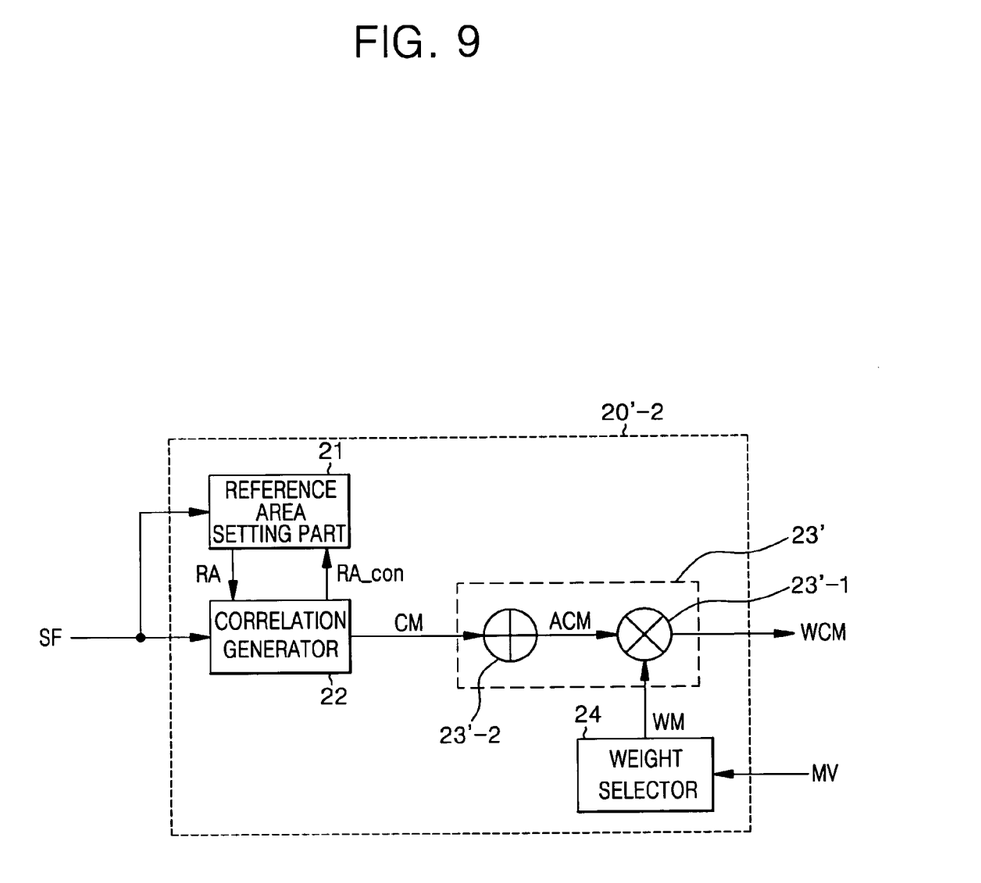
FIG. 9 is a block diagram of a second embodiment of a correlation matrix generator in accordance with the present invention.

FIG. 9 is a block diagram of a second embodiment of a correlation matrix generator in accordance with the present invention.

In FIG. 9, a reference area setting part 21, a correlation generator 22, and a weight selector 24 of a correlation matrix generator 20'-2 operate in the same manner as in FIG. 7.

A weight calculator 23' is composed of an adder 23'-2 and a multiplier 23'-1. The adder 23'-2 adds a certain number to all cells of the correlation matrix CM, and outputs the added correlation matrix ACM to the multiplier 23'-1. When a plurality of cells having the largest correlation in the correlation matrix 131 have a value "0", all of the cells have the value "0" even when different weights are multiplied thereto. Therefore, the adder 23'-2 is additionally provided to add a certain number to all cells in order to prevent occurrence of errors due to the plurality of cells having the largest correlation.

The multiplier 23'-1 receives the added correlation matrix ACM input from the adder 23'-2 and the weighting matrix WM selected by the weight selector 24 to multiply them, and outputs the weighted correlation matrix WCM to the movement value calculator 30'. At this time, each cell of the added correlation matrix ACM and each corresponding cell of the weighting matrix WM are multiplied.

Figure 10:
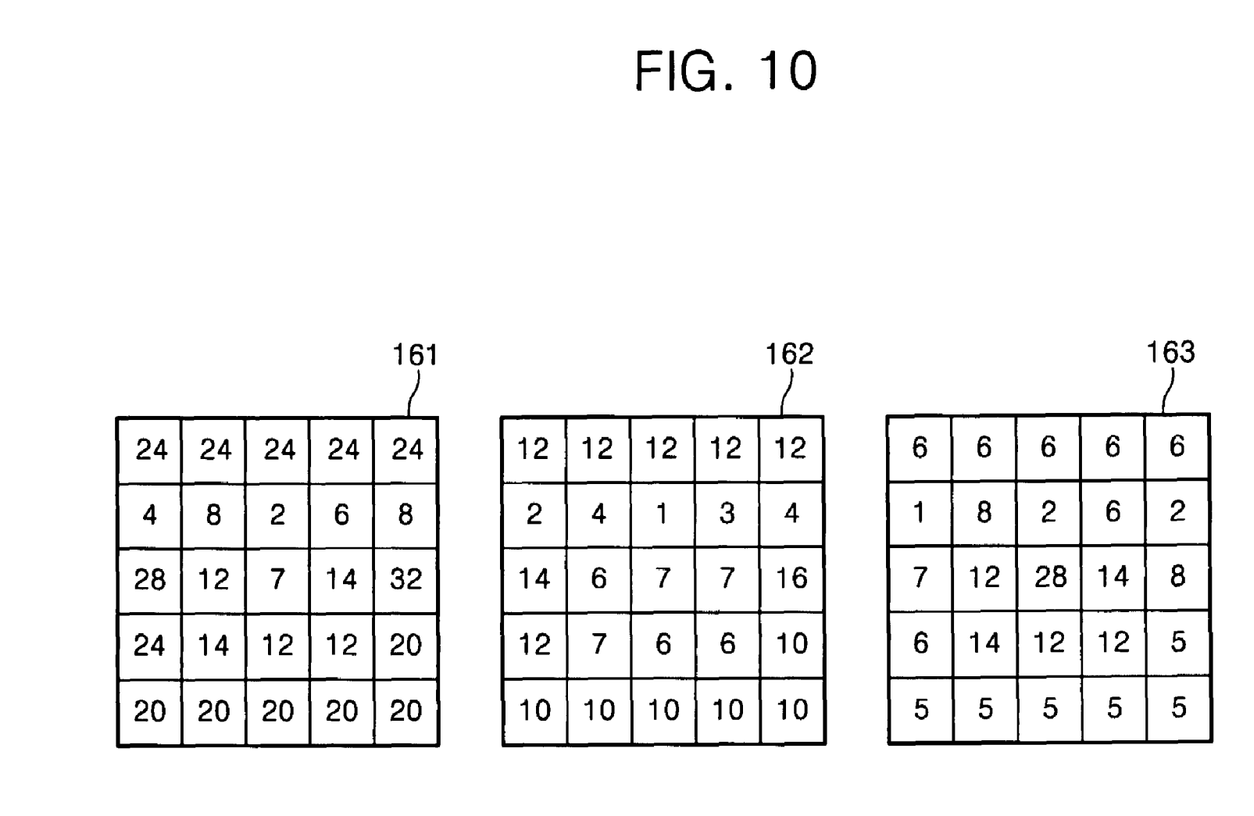
FIG. 10 is a view of a second embodiment of correlation matrices in which the weighting matrices in FIG. 6 are weighted to the correlation matrix in FIG. 4B using a method of FIG. 9.

FIG. 10 is a view of a second embodiment of weighted correlation matrices in which the weighting matrices 141, 142 and 143 in FIG. 6 are weighted to the correlation matrix 131 in FIG. 4B using the method of FIG. 9. In this process, the adder 23'-2 adds "1" as a certain number to each cell of the correlation matrix 131 in FIG. 4B, and then the multiplier 23'-1 multiplies them.

An weighted correlation matrix 161 is generated by adding "1" to each cell of the correlation matrix 131 in FIG. 4B, and multiplying the weighted correlation matrix by the weighting matrix 141 selected when the previous movement value MV is small, i.e., when the optical mouse slowly moves. Since a cell having the smallest value in the weighted correlation matrix 161 has a value "2", a cell C(0,1) has the largest correlation.

An weighted correlation matrix 163 is generated by adding "1" to each cell of the correlation matrix 131 in FIG. 4B, and multiplying the weighted correlation matrix by the weighting matrix 143 selected when the previous movement value MV is large, i.e., when the optical mouse quickly moves. At this time, since a cell having the smallest value in the weighted correlation matrix 163 has a value "1", a cell C(-2,1) has the largest correlation.

An weighted correlation matrix 162 is generated by adding "1" to each cell of the correlation matrix 131 in FIG. 4B, and multiplying the weighted correlation matrix by the weighting matrix 142 selected when the previous movement value MV is middle, i.e., when the optical mouse moves at a middle speed. At this time, since a cell having the smallest value in the weighted correlation matrix 162 has a value "1", a cell C(0,1) has the largest correlation.

While the present invention has a small number of pixels and each pixel has a value "0" or "1" only, the actual optical mouse uses a large number of pixels and each pixel may have various values. While the correlation values are generated by comparing the reference area of the reference frame with the sample frame while moving the reference area, and calculating the number of pixels having different values, the correlation values may be generated using other methods, e.g., calculating the number of pixels having the same value.

Figure 11:
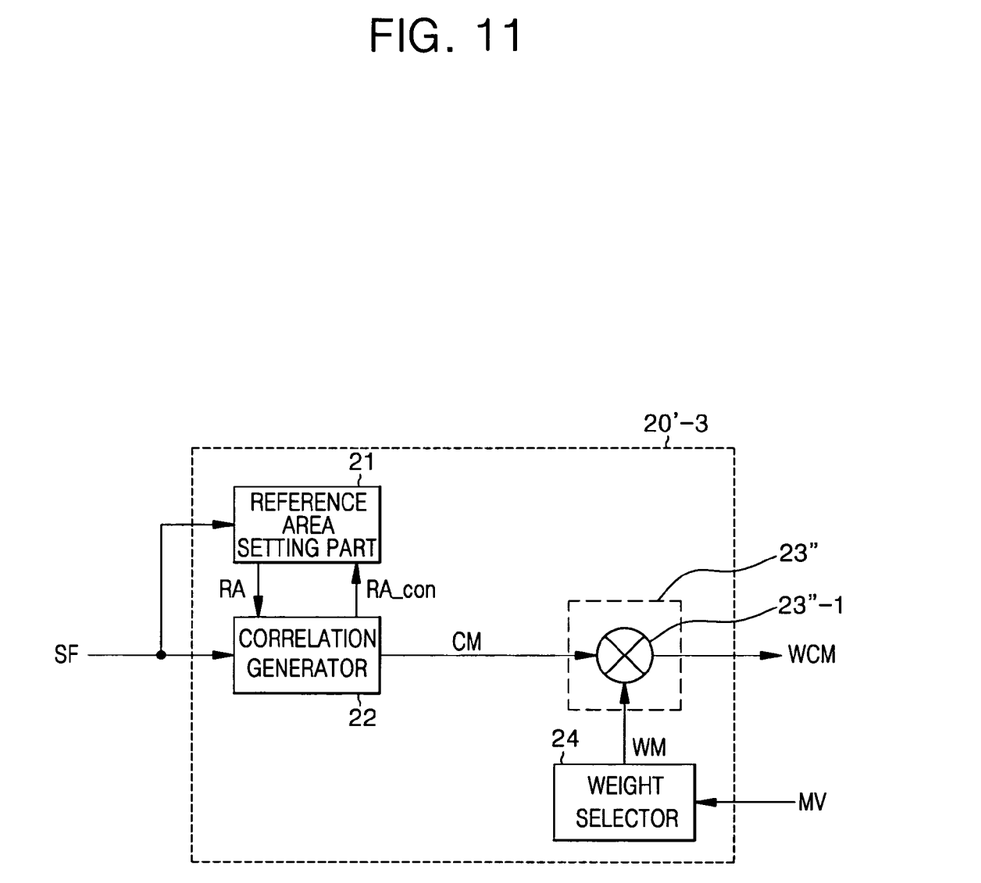
FIG. 11 is a block diagram of a third embodiment of a correlation matrix generator in accordance with the present invention.

Since the actual optical mouse can hardly have a correlation value of "0", the adder 23'-2 may be omitted from the weight calculator 23' to constitute a weight calculator 23" shown in FIG. 11. Therefore, in FIG. 11, the weight calculator 23" is composed of a multiplier 23"-1 only.

In addition, while the present invention is exemplarily illustrated to employ the adder and the multiplier to the correlation calculator, other operators may be employed thereto, and the number of the weighting matrices or a value of each pixel may be changed.

It is natural to replace the calculating blocks of 23, 23', and 23" with programmable CPU. In this case, the adder or the adder and multiplier can be implemented differently in software.

As can be seen from the foregoing, an optical pointing device and a method of computing a movement value thereof in accordance with the present invention can reduce errors, which may be generated when there are a plurality of patterns having a high correlation between a sample frame and a reference area, by weighting different weights depending on speed of the optical pointing device, thereby improving reliability of the optical pointing device.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical pointing device comprising:
    an image input part for emitting light and accumulating the light reflected from a working surface during a sampling period to generate an analog image, and converting the analog image into a digital image to output a sample frame;
    a correlation matrix generator for comparing the sample frame with a reference area to generate a correlation matrix, selecting one weighting matrix of a plurality of weighting matrices in response to a movement value, and outputting a weighted correlation matrix using the selected weighting matrix;
    a movement value calculator for finding a cell having a largest correlation value among the weighted correlation matrix, calculating the movement value and outputting the movement value to a position of the cell, and transmitting the movement value to the correlation matrix generator to select a following weighting matrix; and
    an interface for converting the movement value output from the movement value calculator into a signal of a certain format.

2. The optical pointing device according to claim 1, wherein the correlation matrix generator comprises:
    a reference area setting part for updating a reference frame using the sample frame input during the previous sampling period, and setting a reference area as a certain area of the reference frame;
    a correlation generator for comparing the sample frame input from the image input part with the reference area set in the reference area setting part while moving the reference area in a pixel unit, and calculating each correlation value to generate a correlation matrix;
    a weight selector for receiving the previous movement value from the movement value calculator, and selecting one weighting matrix of a plurality of weighting matrices to output the selected weighting matrix; and
    a weight calculator for weighting the weighting matrix selected from the weight selector in a designated manner with the correlation matrix.

3. The optical pointing device according to claim 2, wherein the weight selector selects a weighting matrix having a larger weight as a cell is positioned far from a center cell when the movement value is small, selects a weighting matrix having a larger weight as a cell is positioned adjacent to a center cell when the movement value is large, and selects a weighting matrix having a smaller increment value from a center cell to peripheral cells than the weighting matrix having a small movement value when the movement value is middle.

4. The optical pointing device according to claim 2, wherein the weight calculator is an adder for adding each value of cells of the correlation matrix to each value of corresponding cells of the weighting matrix.

5. The optical pointing device according to claim 2, wherein the weight calculator is a multiplier for multiplying each value of cells of the correlation matrix by each value of corresponding cells of the weighting matrix.

6. The optical pointing device according to claim 2, wherein the weight calculator is composed of an adder and a multiplier for adding a certain number to each value of cells of the correlation matrix, and multiplying the each added value by each value of corresponding cells of the weighting matrix.

7. The optical pointing device according to claim 1, wherein the image input part comprises:
- a light source for emitting light;
- an image sensor having a plurality of pixels, accumulating the light emitted from the light source and the light reflected from the working surface to be input during the sampling period, and generating an analog image to output the image in a pixel unit; and
- an A/D converter for receiving the output from the image sensor, and converting the output into a digital signal to output a sample frame.

8. A method of computing a movement value of an optical pointing device, comprising:
- an image input step of emitting light, accumulating the light reflected from a working surface during a sampling period to generate an analog image, and converting the analog image into a digital signal to output a sample frame;
- a correlation matrix generating step of comparing the sample frame and a reference area to generate a correlation matrix, selecting one weighting matrix of a plurality of weighting matrices in response to a movement value, and outputting the weighted correlation matrix using the selected weighting matrix;
- a movement value calculating step of finding a cell having a largest correlation value of the weighted correlation, calculating the movement value and outputting the movement value to a position of the cell; and
- an interface step of converting the movement value output from the movement value calculating step into a signal of a certain format and then outputting the result.

9. The method according to claim 8, wherein the correlation matrix generating step comprises:
- a reference area setting step of updating a reference frame using the sample frame input during the previous sampling period, and setting a reference area as a certain area of the reference frame;
- a correlation generating step of comparing the sample frame input from the image input step with the reference area set in the reference area setting step while moving the reference area in a pixel unit, and calculating each correlation value to generate a correlation matrix;
- a weight selecting step of receiving the previous movement value from the movement value calculating step, and selecting one weighting matrix of a plurality of weighting matrices to output the selected weighting matrix; and
- a weight calculating step of weighting the weighting matrix selected from the weight selecting step in a designated manner with the correlation matrix.

10. The method according to claim 9, wherein the weight selecting step selects a weighting matrix having a larger weight as a cell is positioned far from a center cell when the movement value is small, selects a weighting matrix having a larger weight as a cell is positioned adjacent to a center cell when the movement value is large, and selects a weighting matrix having a smaller increment value from a center cell to peripheral cells than the weighting matrix having a small movement value when the movement value is middle.

11. The method according to claim 9, wherein the weight calculating step comprises a step of adding each value of cells of the correlation matrix to each value of corresponding cells of the weighting matrix.

12. The method according to claim 9, wherein the weight calculating step comprises a step of multiplying each value of cells of the correlation matrix by each value of corresponding cells of the weighting matrix.

13. The method according to claim 8, wherein the correlation matrix generating step comprises steps of adding a certain number to each value of cells of the correlation matrix, and multiplying the added value by each value of corresponding cells of the weighting matrix.

* * * * *